A. P. DABOLL.
Bit-Stocks.

No. 139,876.   Patented June 17, 1873.

Witnesses.
S. N. Piper
L. N. Möller

Austin P. Daboll.
by his attorney
R. H. Eddy

AM. PHOTO-LITHOGRAPHIC CO. N.Y. (OSBORNE'S PROCESS.)

UNITED STATES PATENT OFFICE.

AUSTIN P. DABOLL, OF NEW LONDON, CONNECTICUT.

IMPROVEMENT IN BIT-STOCKS.

Specification forming part of Letters Patent No. 139,876, dated June 17, 1873; application filed March 29, 1873.

*To all whom it may concern:*

Be it known that I, AUSTIN P. DABOLL, of the city and county of New London, of the State of Connecticut, have invented a new and useful Improvement in Bit-Stocks; and do hereby declare the same to be fully described in the following specification and represented in the accompanying drawings, of which—

Figure 1:
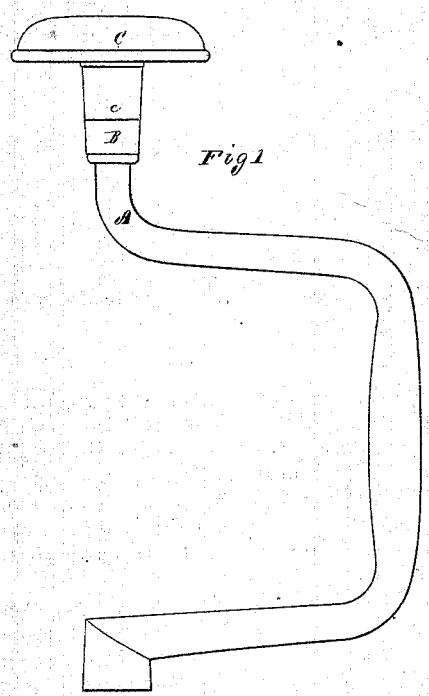
Figure 2:
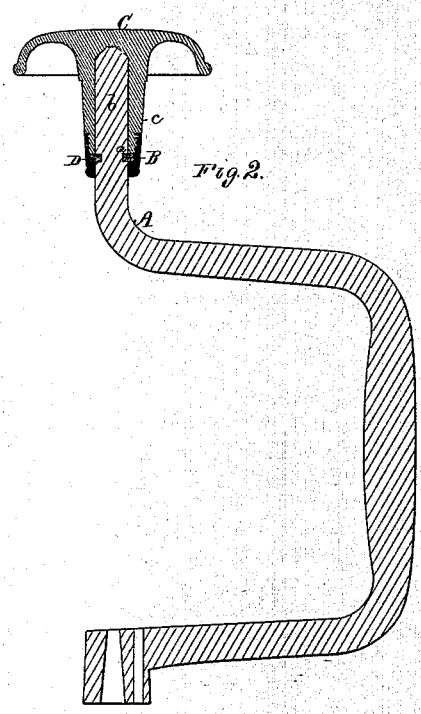
Figure 3:
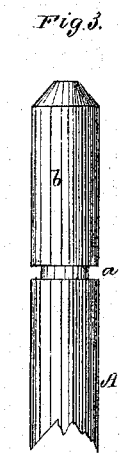
Figure 4:

Figure 1 denotes a side view, and Fig. 2 a longitudinal section, of the head and shank of a bit-stock with my improvement. Fig. 3 is a view of the shank part, and Fig. 4 is a view of the split ring or washer, applied or to be applied to such shank.

In carrying out my invention, I form the shank A with a groove, $a$, extended in and around it near its upper end or pivot $b$, and into and around such groove. After having slipped upon the shank a screw-cap or thimble, B, to screw upon the neck $c$ of the head C, I spring or bend the annulus or washer D, which is to extend beyond the shank A and into the thimble when the latter is screwed upon the neck, the washer serving to keep the shank in connection with the head.

Were the shank to have a fixed shoulder to project from it in the place of the split ring and groove the thimble could not be placed upon the shank so as to receive the shoulder, because the thimble to be so applied would have to be put upon the stock from its lower or bit-carrying end, such being an impossibility, owing to the size of the stock at such end as well as elsewhere.

I make no claim to either of the modes shown in patents Nos. 15,632, 63,944, of connecting the head and spindle of a bit-brace, as an essential feature of my improvement is the split ring, arranged in the circular groove $a$, and used in connection with the screw-cap or thimble B and the head C applied together, as described and represented.

I claim—

In the bit brace or stock, the split ring D, arranged in the circular groove $a$, and with the lower end of the head C and within the screw-cap B applied to such head C, as set forth.

AUSTIN P. DABOLL.

Witnesses:
WILLIAM BELCHER,
C. M. DABOLL.